L. SAMUEL.
TRUCK WHEEL BLOCKING DEVICE.
APPLICATION FILED JUNE 18, 1909.
940,365.
Patented Nov. 16, 1909.
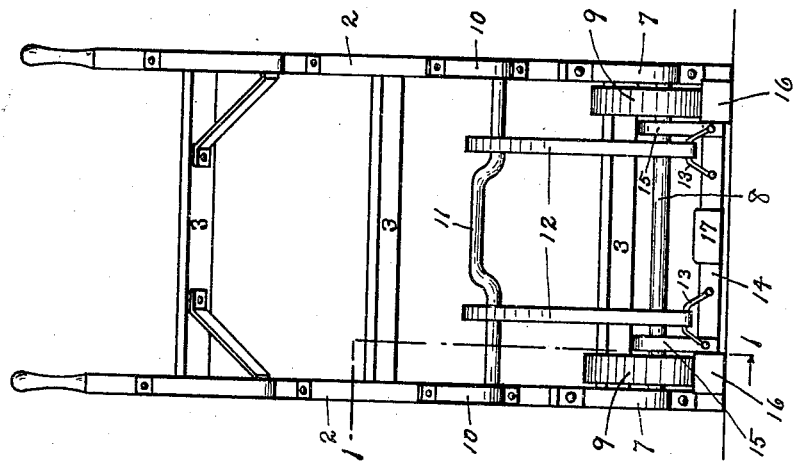
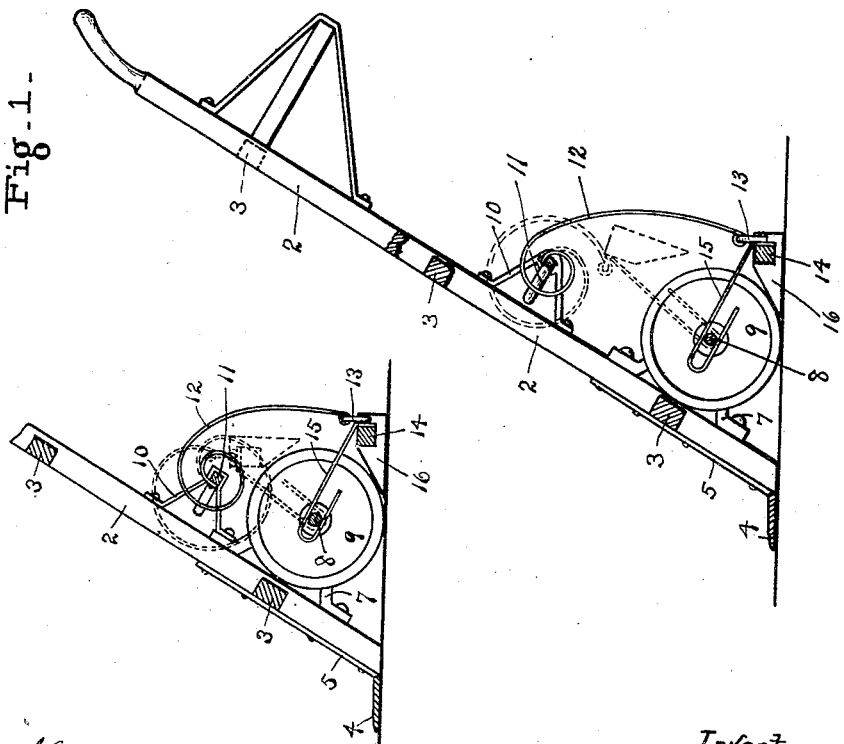
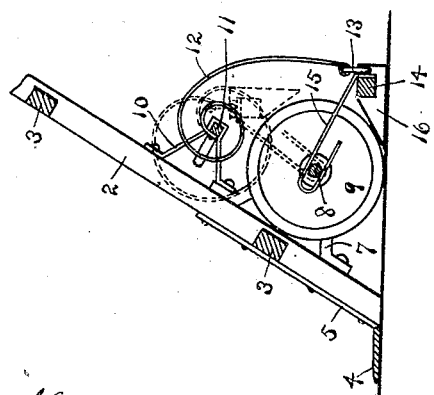
Witnesses:
J. H. Perrault
E. M. Brown.
Inventor
Lee Samuel.
By Edward N. Pagelsen
Attorney.

UNITED STATES PATENT OFFICE.

LEE SAMUEL, OF CHICAGO, ILLINOIS.

TRUCK-WHEEL-BLOCKING DEVICE.

940,365.  Specification of Letters Patent.  Patented Nov. 16, 1909.

Application filed June 18, 1909. Serial No. 502,884.

*To all whom it may concern:*

Be it known that I, LEE SAMUEL, a citizen of the United States, and a resident of Chicago, in the county of Cook and State of Illinois, have invented a new and Improved Truck-Wheel-Blocking Device, of which the following is a specification.

This invention relates to means for holding the wheels of hand-trucks stationary by blocking them while a heavy object is being loaded onto the truck, and its object is to provide a simple and effective blocking device which can be easily and cheaply mounted on any truck of the size for which it is adapted.

In the accompanying drawing, Figure 1 is an elevation and partial cross-section of a truck on the line 1—1 of Fig. 2. Fig. 2 is a view of the bottom side of the truck when in loading position. Fig. 3 is a partial cross section similar to Fig. 1 showing the preferred arrangement of the parts.

Similar reference characters refer to like parts throughout the several views.

The truck shown is of well known construction and has side frames 2 which are connected by the cross-bars 3 and the metal cross-plate 4, which plate has arms 5 which are secured to the side frames. Brackets 7 furnish bearings for the axle 8, on the ends of which are secured the wheels 9. Two forms of the improved device are shown, that in Fig. 3 being preferred because of compactness.

In the drawings, the brackets 10 support the cross-rods 11. These brackets are shown much nearer the axle in Fig. 3 than in Fig. 1, and the compact construction is to be preferred because less material is necessary and because the parts may be placed in operative position with less effort, but the construction in Fig. 1 may be desirable under certain circumstances. To the cross-rod 11 are secured the springs 12 which are normally in the position shown in dotted lines in Fig. 1. The free ends of the springs carry links 13 which connect to the cross-bar 14. This cross-bar is provided with hooks 15 which extend across the axle, and when the parts are in normal position, serve to hold the cross-bar in proper position. On the ends of the cross-bar are the blocks 16 and at the middle may be secured a plate 17.

The operation of this device is as follows. The parts being in the position shown in dotted lines in Figs. 1 or 3, and the plate 4 pushed up against or under the edge of the article to be loaded onto the truck, the truckman places his foot on the plate 17, and presses down the cross-bar 14, carrying down the blocks 16 to the position shown in solid lines in the drawings. When the handles are now swung down there is no chance for the wheels to run back as they are well blocked. After the truck is loaded, it may be pushed ahead a few inches to free the blocks which are immediately swung back to normal position, indicated by dotted lines, by the springs 12. The rod 11 has its middle portion bent to afford free space for the toes of the truckman when he reaches for the bar 14 with his foot.

As trucks are made in but few sizes, these blocking devices can be manufactured in lots for each size of truck and attached as desired, no special fitting being necessary. The slight changes necessary for odd sizes of trucks can be easily made by any mechanic.

Having now explained my improvements, what I claim as my invention and desire to secure by Letters Patent is;—

1. In a truck-wheel blocking device, the combination with the truck-frame, axle and wheels, of a cross-rod mounted on the lower side of the frame, springs supported by the rod, a cross-bar mounted on the springs, wheel-blocks on the ends of the cross-bar, and hooks connected to the cross-bar and adapted to engage the axle to guide the movement of the cross-bar and wheel-blocks.

2. In a truck-wheel blocking device, the combination of springs mounted on the truck-frame, a cross bar carried by the springs, blocks carried by the bar, and means to limit the movement of the bar, the springs permitting the blocks to be swung so as to engage between the truck wheels and floor.

In testimony whereof, I have signed this specification in the presence of two subscribing witnesses.

LEE SAMUEL.

Witnesses:
 JOHN M. RICE,
 R. M. RHEA.